(12) United States Patent
Case

(10) Patent No.: US 9,104,898 B2
(45) Date of Patent: Aug. 11, 2015

(54) UTILIZING FORCE INFORMATION TO IMPROVE FINGERPRINT READING

(71) Applicant: Lenovo (Singapore) Pte, Ltd., New Tech Park (SG)

(72) Inventor: Michaela Rose Case, Raleigh, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 128 days.

(21) Appl. No.: 13/683,620

(22) Filed: Nov. 21, 2012

(65) Prior Publication Data

US 2014/0140586 A1    May 22, 2014

(51) Int. Cl.
*G06K 9/00*  (2006.01)
(52) U.S. Cl.
CPC .................................. *G06K 9/00013* (2013.01)
(58) Field of Classification Search
CPC .................................. G06K 9/00013
USPC ..................................... 382/115, 124
See application file for complete search history.

(56) References Cited

U.S. PATENT DOCUMENTS

| | | | | |
|---|---|---|---|---|
| 6,064,753 | A * | 5/2000 | Bolle et al. | 382/125 |
| 6,131,464 | A * | 10/2000 | Pare et al. | 73/714 |
| 6,400,836 | B2 * | 6/2002 | Senior | 382/124 |
| 7,280,679 | B2 * | 10/2007 | Russo | 382/124 |
| 8,604,364 | B2 * | 12/2013 | Simon et al. | 178/18.03 |
| 2006/0078174 | A1 * | 4/2006 | Russo | 382/121 |
| 2010/0008552 | A1 * | 1/2010 | Shin et al. | 382/124 |
| 2010/0066697 | A1 * | 3/2010 | Jacomet et al. | 345/173 |
| 2011/0254771 | A1 * | 10/2011 | Zimchoni | 345/168 |
| 2011/0298711 | A1 * | 12/2011 | Dean et al. | 345/161 |
| 2013/0214801 | A1 * | 8/2013 | Hsiao | 324/692 |

* cited by examiner

*Primary Examiner* — Gregory M Desire
(74) *Attorney, Agent, or Firm* — Kunzler Law Group

(57) ABSTRACT

For utilizing force information to improve fingerprint reading, a fingerprint scanner generates a digital representation of a fingerprint for a finger in contact with the fingerprint scanner. A pressure sensor is in physical communication with the fingerprint scanner and measures a finger force of the finger.

16 Claims, 7 Drawing Sheets

UTILIZING FORCE INFORMATION TO IMPROVE FINGERPRINT READING

BACKGROUND

1. Field

The subject matter disclosed herein relates to fingerprint reading and more particularly relates to utilizing force information to improve fingerprint reading.

2. Description of the Related Art

Fingerprints are often scanned to identify an individual. Unfortunately, the manner in which a finger is placed on a scanner can significantly affect the scan.

BRIEF SUMMARY

Based on the foregoing discussion, the inventor has recognized a need for an apparatus, method, and system that utilizes force information to improve fingerprint reading. The apparatus includes a fingerprint scanner and a pressure sensor. The fingerprint scanner generates a digital representation of a fingerprint for a finger in contact with the fingerprint scanner. The pressure sensor is in physical communication with the fingerprint scanner. The pressure sensor measures a finger force of the finger. The method and system that perform the functions of the apparatus are also disclosed. These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
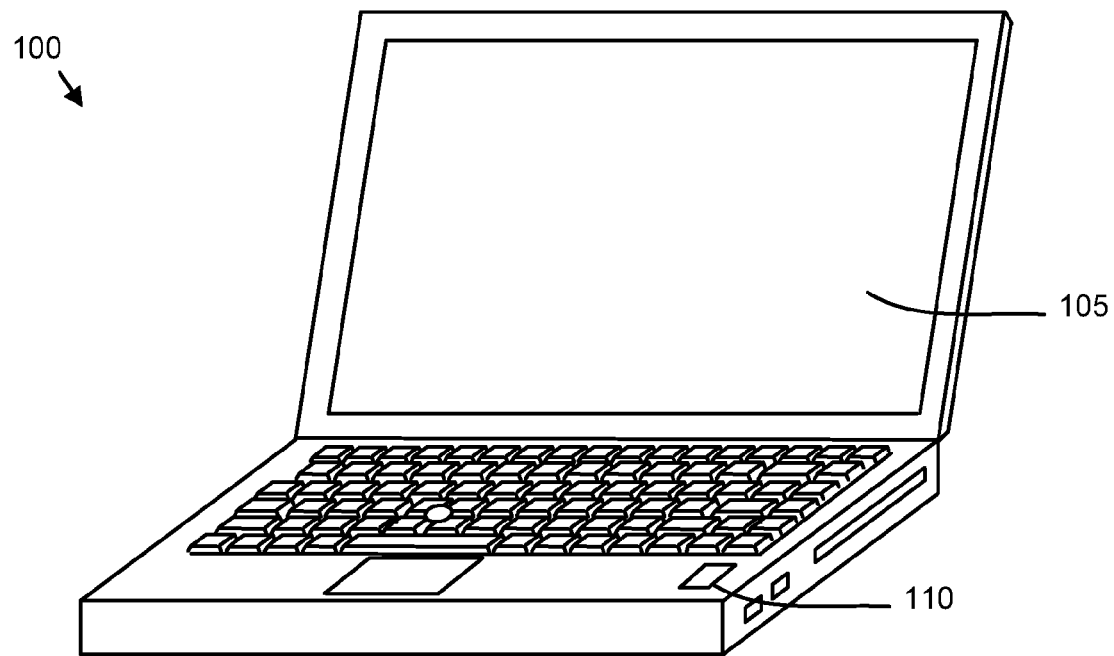
FIG. 1 is perspective drawing illustrating one embodiment of a data processing system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of Figures may refer to elements described in previous Figures, like numbers referring to like elements.

FIG. 1 is perspective drawing illustrating one embodiment of a data processing system 100. The data processing system 100 is depicted as a laptop computer. However one of skill in the art will be recognized at the system 100 may be practiced with other types of data processing system configurations. The data processing system 100 includes a display 105 and a fingerprint scanner/pressure sensor 110.

In one embodiment, the fingerprint scanner/pressure sensor 110 is used to identify the user of the data processing system 100. For example, a digital representation of the user's fingerprint may be captured and compared with a reference representation to establish the identity of the user.

Unfortunately, the amount of force and the direction of the force of a finger applied to the fingerprint scanner/pressure sensor 110 may alter the resulting digital representation of the fingerprint. The embodiments described herein measure a finger force of the finger and may use the finger force to modify the digital representation of the fingerprint as will be described hereafter.

Figure 2:
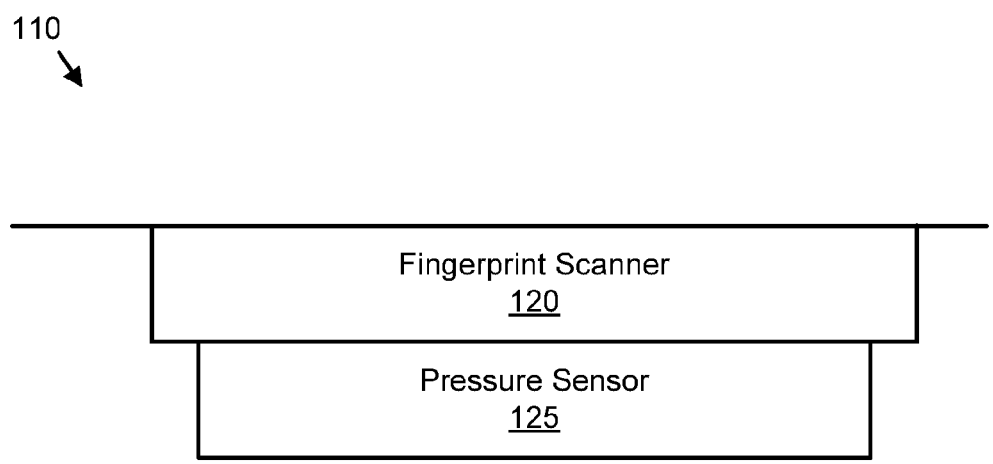
FIG. 2 is a side view drawing illustrating one embodiment of a fingerprint scanner and pressure sensor.

FIG. 2 is a side view drawing illustrating one embodiment of a fingerprint scanner 120 and pressure sensor 125. The fingerprint scanner 120 and the pressure sensor 125 may be the fingerprint scanner/pressure sensor 110 of FIG. 1.

The fingerprint scanner 120 may selected from the group consisting of an optical scanner, a thermal scanner, a silicone scanner, and an ultrasonic scanner. The fingerprint scanner 120 may capture characteristics of ridges and valleys of the fingerprint and store the characteristics as a digital representation of the fingerprint. In one embodiment, the digital representation is organized as a two-dimensional array, with each element of the array representing a spatial location of the fingerprint. Each element may have a value corresponding to a coloration of the finger at the spatial location, a depth of a valley and/or height of a ridge at the spatial location, or the like. A reference representation may be equivalent in structure and function to the digital representation.

In one embodiment, the fingerprint scanner 120 is a Synaptics ForcePad manufactured by Synaptics of Santa Clara, Calif. In one embodiment, the fingerprint scanner 120 only captures fingerprints. In an alternate embodiment, the fingerprint scanner 120 may be a portion of a display such as the display 105 of FIG. 1.

The pressure sensor 125 is in physical communication with the fingerprint scanner 120. In the depicted embodiment, the pressure sensor 125 is disposed beneath the fingerprint scanner 120. The pressure sensor 125 may be connected to the fingerprint scanner 120 using fasteners, adhesives, brackets, or the like. Alternatively, the pressure sensor 125 may be connected to the fingerprint scanner 120 using couplings, cables, and the like.

In one embodiment, the pressure sensor 125 is integrated within the fingerprint scanner 120. For example, the fingerprint scanner/pressure sensor 110 may include the pressure sensor 125 disposed within the fingerprint scanner 120.

In one embodiment, the pressure sensor 125 includes one or more strain gauges. A force value may be calculated from each strain measured by the strain gauges. In one embodiment, each strain is represented as a digital value. In a certain embodiment, each strain value is combined into an aggregate value and converted into an aggregate digital force value. In an alternate embodiment, the pressure sensor 125 employs one or more accelerometers. An acceleration value from an accelerometer may be converted into the force value. In one embodiment, a plurality of force values is aggregated into an aggregate digital force value.

In one embodiment, the pressure sensor 125 measures a deformation of the fingerprint scanner 120 to measure the finger force. Alternatively, the pressure sensor 125 may measure transmitted force from the fingerprint scanner 120 to determine the finger force. The pressure sensor 125 may measure a plurality of forces over the surface of the fingerprint scanner 120.

In a certain embodiment, the finger force includes a swipe trajectory. The pressure sensor 125 may associate a timestamp with each of the plurality of forces over the surface of the fingerprint scanner 120. In a certain embodiment, the pressure sensor 125 measures forces at a plurality of times and at a plurality of spatial locations on the surface of the fingerprint scanner 120. The pressure sensor 125 may further generate a force array comprising a pressure at each spatial location at each time.

The swipe trajectory may be calculated from the force array. For example, spatial locations that detect force applied to the fingerprint scanner 120 at earlier times may be identified as a start of a swipe and spatial locations that detect force applied to the fingerprint scanner 120 at later times may be identified as an end of the swipe. The start and end of the swipe may form of vector indicating the swipe trajectory.

Figure 3:
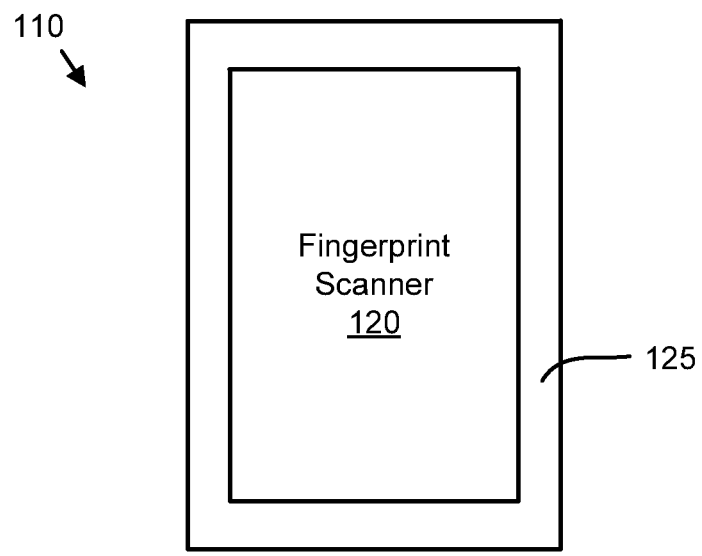
FIG. 3 is a top view drawings illustrating one alternate embodiment of a fingerprint scanner and pressure sensor.

FIG. 3 is a top view drawings illustrating one alternate embodiment of a fingerprint scanner 120 and pressure sensor 125. The fingerprint scanner 120 and the pressure sensor 125 are the fingerprint scanner 120 and the pressure sensor 125 of FIG. 2. In the depicted embodiment, the pressure sensor 125 is mounted around the horizontal edge of the fingerprint scanner 120. The pressure sensor 125 may include a plurality of strain gauges and/or accelerometers in communication with the fingerprint scanner 120.

Figure 4:
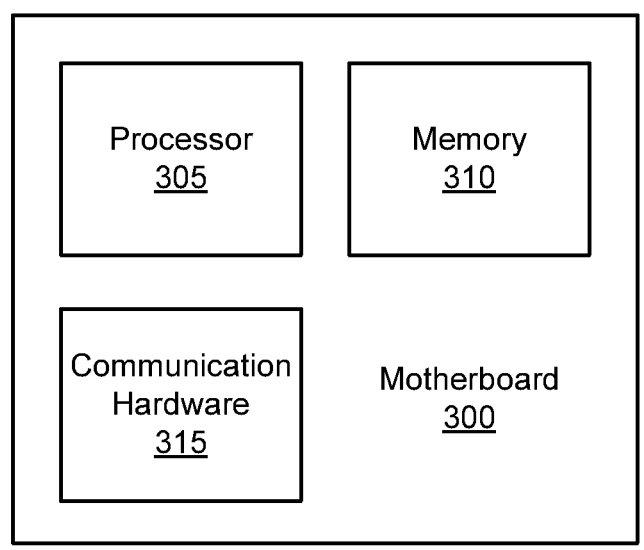
FIG. 4 is a schematic block diagram illustrating one embodiment of a motherboard.

FIG. 4 is a schematic block diagram illustrating one embodiment of a motherboard 300. The motherboard 300 may be disposed in the data processing system 100. The motherboard 300 includes a processor 305, a memory 310, and communication hardware 315. The memory 310 may be a computer readable storage medium such as a semiconductor storage device, a hard disk drive, a holographic storage device, a micromechanical storage device, or the combinations thereof. The memory 310 may store machine readable code. The processor 305 may execute the machine readable code. The communication hardware 315 may communicate with other devices.

Figure 5:
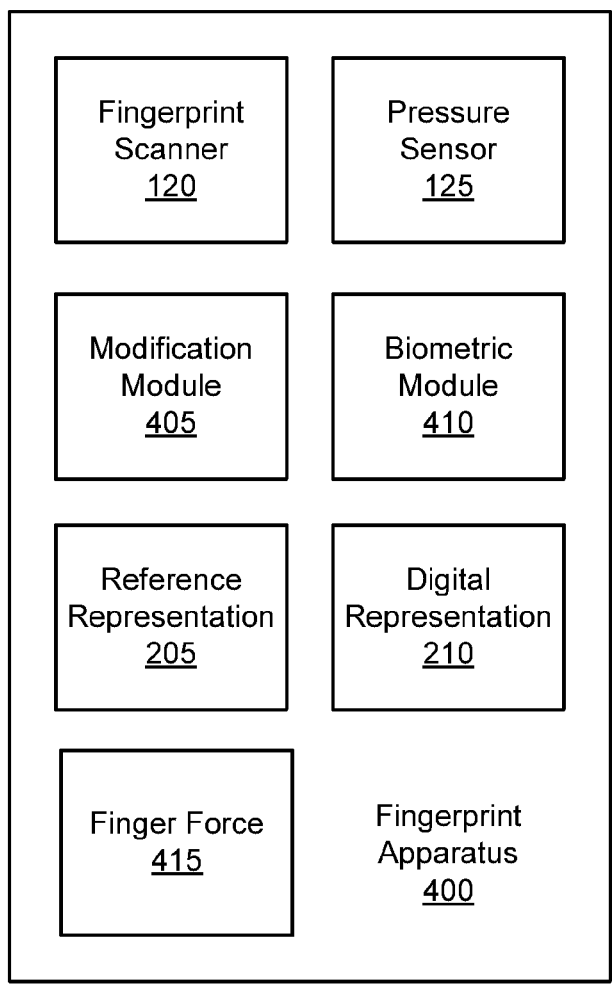
FIG. 5 is a schematic flow chart diagram illustrating one embodiment of a fingerprint apparatus.

FIG. 5 is a schematic flow chart diagram illustrating one embodiment of a fingerprint apparatus 400. The apparatus 400 may be embodied in the motherboard 300 of FIG. 4. Alternatively, the apparatus 400 may be embodied in the fingerprint scanner/pressure sensor 110 of FIGS. 1-3. The apparatus 400 includes the fingerprint scanner 120 and the pressure sensor 125. In addition, the apparatus 400 may include a modification module 405, a biometric module 410, a reference representation 205, a digital representation 210, and a finger force 415.

The modification module 405 and the biometric module 410 may be embodied in a computer readable storage medium such as the memory 410 storing machine readable code. The machine readable code may be executed by the processor 405 to perform functions of the embodiments as will be described hereafter.

The fingerprint scanner 120 generates the digital representation 210 of a fingerprint for a finger in contact with the fingerprint scanner 120. In one embodiment, the reference representation 205 is captured during a learning phase where in the force sensor 120 and/or the data processing system 100 associates the reference representation 205 with the identity of the user. The digital representation 210 may be compared with the reference representation 205 to authenticate the identity of the finger and the user.

The modification module 405 may receive the digital representation 210 and the finger force 415 from the fingerprint scanner 120 and the pressure scanner 125 respectively. The modification module 405 may further modify the digital representation 210 in response to the finger force 415.

Figures 6A, 6B:
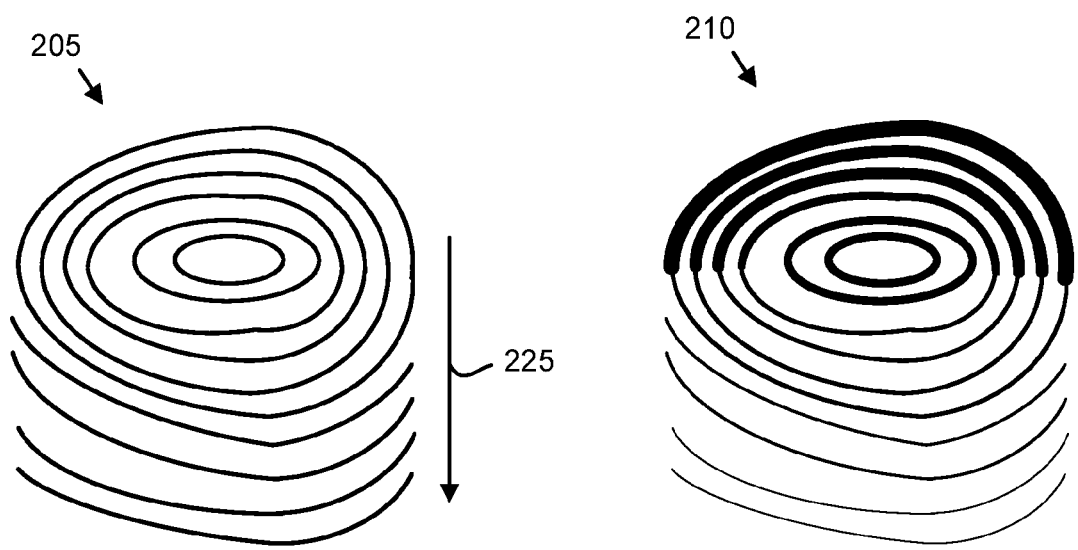
FIGS. 6A-B are drawings illustrating one embodiment of a reference representation and a digital representation of a fingerprint.

FIGS. 6A-B are drawings illustrating one embodiment of a reference representation 205 and a digital representation 210 of a fingerprint. The representations 205, 210 are depicted as though rendered as an image in order to illustrate differences between the reference representation 205 and the digital representation 210.

In one embodiment, the reference representation 205 depicted in FIG. 6A is generated as an aggregate of a plurality of scans of a finger. Each scan may generate a digital representation 210. The characteristics of a digital representation 210 of each scan may be averaged to form the reference representation 205. Characteristics may include outlines, colors, sizes, and depths of fingerprint ridges and/or valleys.

In one embodiment, a smoothing algorithm is applied to the digital representations 210 to generate the reference representation 205. Alternatively, a median value for each portion of a ridge and/or valley of the fingerprint may be selected to generate the reference representation 205. In a certain embodiment, statistical outliers for ridge and valley portions greater than one sigma may not be considered when generating the reference representation 205. In one embodiment, the reference representation 205 comprises an outline of one of fingerprint ridges or fingerprint valleys.

The reference representation 205 may include an orientation 225. The orientation 225 may be determined from an aggregate of swipe trajectories from the digital representations 210 averaged to form the reference representation 205. Alternatively, the orientation 225 may be calculated from edges of reference representation 205.

FIG. 6B shows the digital representation 210 from a single scan of the finger by the fingerprint scanner 120. The digital representation 210 may comprises an array with the same data structure as the reference representation 205.

As depicted as a prophetic example, an upper portion of the digital representation 210 indicates wider ridges and narrower valleys relative to the reference representation 205. The wider ridges and narrower valleys may be caused by the finger applying a greater force on an upper portion of the finger while the fingerprint scanner 120 scans the finger.

As a result, the digital representation 210 may not be validated as belonging to the user when compared with the reference representation 205. The data processing system 100 therefore may be unable to authenticate the user and may deny access to the user. The embodiments described herein modify the digital representation 210 so that the digital representation 210 may be compared with the reference representation 205 to determine the identity of the user.

Figure 7:
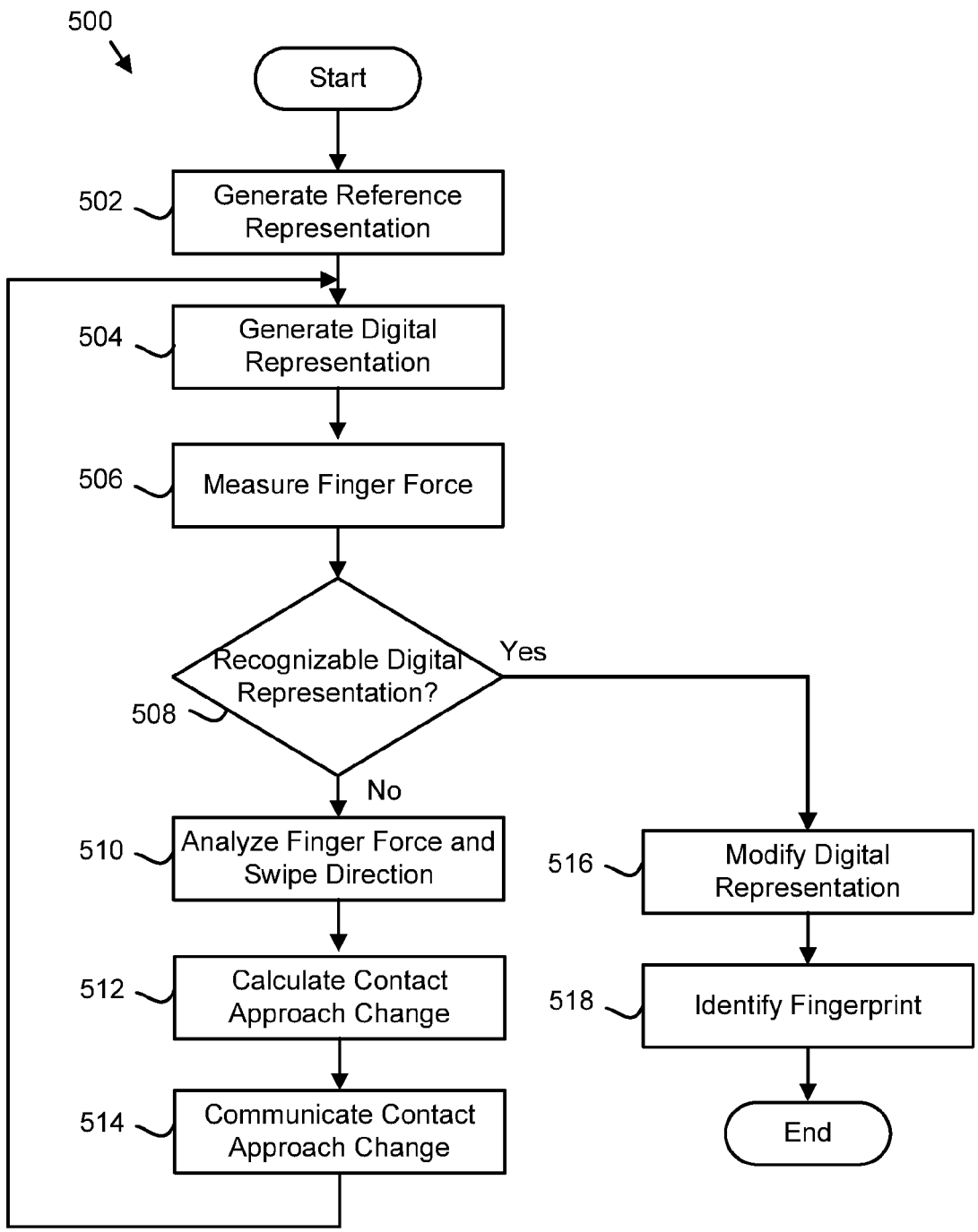
FIG. 7 is a schematic flow chart diagram illustrating one embodiment of a digital representation modification method.

FIG. 7 is a schematic flow chart diagram illustrating one embodiment of a digital representation modification method 500. The method 500 may perform the functions of the apparatus 400 and the system 100. In one embodiment, a portion of the method 500 is performed by a computer readable storage medium such as the memory 310 storing machine readable code. The machine readable code may be executed by the processor 305 to perform the functions of the method 500.

The method 500 starts, and in one embodiment the fingerprint scanner 120 generates 502 the reference representation 205. The reference representation 205 may be generated during a learning phase. In one embodiment, the fingerprint scanner 120 may scan the finger multiple times during a learning phase. Each digital representation 210 from each scan may be combined to generate 502 the reference representation 205. In one embodiment, the reference representation 205 is stored in the memory 310 of the motherboard 300.

The user may place a finger on the fingerprint scanner 120 and the fingerprint scanner generate 504 a digital representation 210 of the fingerprint in contact with the fingerprint scanner 120. In one embodiment, the user may place the finger on the fingerprint scanner 120 so that the user may be authenticated and given access to the data processing system 100.

The pressure sensor 125 measures 506 a finger force 415 of the finger in contact with the fingerprint scanner 120. The measurement of the finger force 415 may be concurrent with scanning the finger by the fingerprint scanner 120. The pressure sensor 125 is in physical communication with the fingerprint scanner 120. The finger force 415 may comprise the forces applied to each strain gauge and/or accelerometer of the pressure sensor 125 at a plurality of times. In one embodiment, each force is represented as a vector.

In one embodiment, the biometric module 410 determines 508 if the digital representation 210 is recognizable. The digital representation 210 may be recognizable if the digital representation 210 matches the reference representation 205.

In one embodiment the biometric module 410 determines 508 that the digital representation 210 is not recognizable if sizes of the ridge portions and/or sizes of the valley portions exceed a minimum size threshold and/or a maximum size threshold. The minimum size threshold may be exceeded if the size of a ridge portion and/or a valley portion is less than 50% of an average ridge size and an average valley size respectively. In addition, the maximum size threshold may be exceeded if the size of the ridge portion and/or the valley portion is greater than 150% of the average ridge size and the average valley size.

In one embodiment, the biometric module 410 determines 508 that the digital representation 210 is not recognizable if an area of ridges and/or valleys has no recognizable valleys.

If the biometric module 410 determines 508 that the digital representation 210 is recognizable, the modification module 405 modifies 516 the digital representation 210 in response to the finger force to generate a modified digital representation as will be described hereafter.

In one embodiment, the modification module 405 delimits the digital representation 210 as a partial fingerprint in response to the finger force 415. The delimited digital representation 210 may only be compared with a portion of the reference representation 205.

Figure 8:
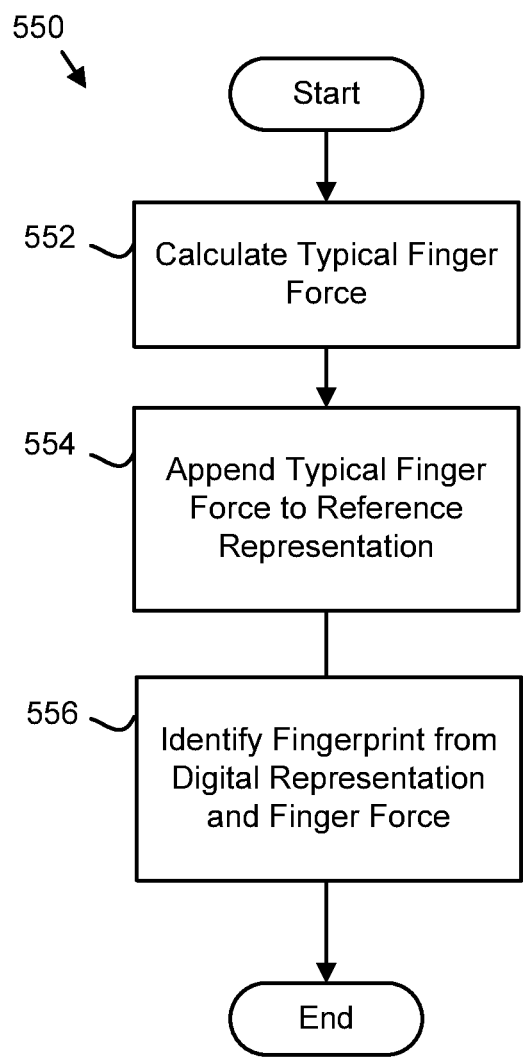
FIG. 8 is a schematic flowchart diagram illustrating one embodiment of a fingerprint identification method.

The biometric module 410 may further identify 518 the fingerprint by comparing the modified digital representation to the reference representation 205 and the method 500 ends. FIG. 8 details the identification 518 of the fingerprint.

If the biometric module 410 determines 508 that the digital representation 210 is not recognizable, the biometric module 410 may analyze 510 the finger force 415. In one embodiment, the biometric module 410 may compare the finger force 415 to aggregate finger force 415 stored with the reference representation 205.

The biometric module 410 may calculate 512 a contact approach change from the finger force 415. The contact approach change may comprise a vector for approaching the fingerprint scanner 120 with the finger, a location on the fingerprint scanner 120 for placing the finger, and the like in order to replicate the aggregate finger force 415.

The contact approach change may be communicated 514 to the user, an administrator, and the like. In one embodiment, the contact approach change may be communicated 514 to the user on the display 105. The method 500 may loop to again generate 504 the digital representation 210.

FIG. 8 is a schematic flowchart diagram illustrating one embodiment of a fingerprint identification method 550. The method 550 may be performed in the identify fingerprint step 518 of FIG. 7. The method 500 may perform the functions of the apparatus 400 and the system 100. In one embodiment, a portion of the method 550 is performed by a computer readable storage medium such as the memory 310 storing machine readable code. The machine readable code may be executed by the processor 305 to perform the functions of the method 550.

The method 550 starts, and in one embodiment the biometric module 410 calculates 552 a typical finger force 415. The typical finger force 415 may be an aggregate of a plurality of finger forces 415. In one embodiment, the typical finger force 415 is calculated 552 during the learning phase. Alternatively, each time the fingerprint of the finger is validated as matching the reference representation 205, the finger force 415 associated with the digital representation 210 may be aggregated with the typical finger force 415.

For example, the typical finger force 415 may be calculated as an aggregate of two or more finger forces 415 measured during the learning phase. The biometric module 410 may subsequently aggregate each finger force 415 to the typical finger force 415 for a fingerprint that is validated. In one embodiment, the typical finger force 415 is a pixel-by-pixel average of a plurality of finger forces 415. In one embodiment, each finger force 415 includes at least one force vector.

The biometric module 410 may further append 554 the typical finger force 415 to the reference representation 205. In one embodiment, the typical finger force 415 is the marked by header within the reference representation 205. The aggregated finger force 415 data may follow the header in the reference representation 205.

The biometric module 410 may calculate pixel-by-pixel differences between the reference representation 205 and the digital representation 210. The digital representation may match the reference representation 205 if a specified number of standard deviations of the differences exceed a standard deviation threshold.

In an alternate embodiment, the biometric module 410 compares the digital representation 210 to a filter matched to an impulse response of the reference representation 205. The digital representation 210 matches the reference representation 205 if a filter threshold is met.

The biometric module 410 further identifies 556 the fingerprint from the digital representation 210 and the finger force 415. The typical finger force 415 may be used to identify 556 the fingerprint by validating the digital representation 210 with the finger force 415 associated with the digital representation 210. For example, the biometric module 410 may compare the reference representation 205 to the digital representation 210 and also compare the typical finger force 415 with the finger force 415 of the digital representation 210.

In one embodiment, the typical finger force 415 is used to identify the fingerprint if a match of the reference representation 205 and the digital representation 210 falls below a match threshold but is greater than a rejection threshold. For example, if the match threshold is 50% and the rejection threshold is 40%, and the match between the reference representation 205 and the digital representation 210 is 45%, the biometric module 410 may compare the finger force 415 of the digital representation 210 with the typical finger force 415 and validate the digital representation 210 if a match between the finger force 415 in the typical finger force 415 exceeds a force match threshold.

Figure 9:
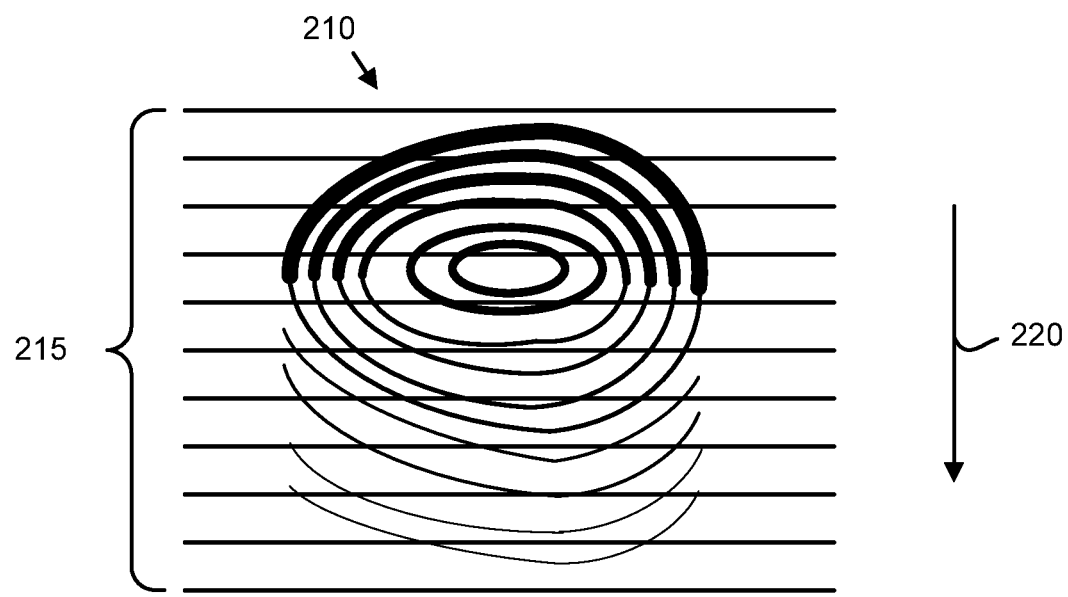
FIG. 9 is a drawing illustrating one embodiment of modifying a digital representation with a pressure gradient.

FIG. 9 is a schematic block diagram illustrating one embodiment of modifying a digital representation 210 with a pressure gradient 215. The pressure gradient 215 may have a gradient direction 220. The gradient direction 215 may be vector from a first end of the pressure gradient 215 to a second end of the pressure gradient 215. In one embodiment, the gradient direction 220 is set equivalent to the swipe direction.

The pressure gradient 215 may specify a different level of modification of the digital representation 210 over the pressure gradient 215. In the depicted embodiment, the pressure gradient 215 includes a plurality of discrete intervals. A specified modification may be applied to the digital representation 210 within each discrete interval. For example, a greater modification may be applied to the digital representation 210 within a first interval than a modification applied to the digital representation 210 within a second interval. Alternatively, a modification may be applied as a function of a distance from the first end of the pressure gradient 215.

In one embodiment, a modification adjusts a size of a ridge portion relative to a corresponding finger force 415 for the ridge portion. The modification module 405 may modify the size of a ridge portion or a valley portion S1 of the digital representation 210 using Equation 1, where F1 is a corresponding finger force 415 for the digital representation 210, F0 is a corresponding typical finger force 415 for the reference representation 205, k is a non-zero constant, and MS1 is the modified size of the ridge portion or valley portion.

$$MS1 = k*S1*F0/F1 \qquad \text{Equation 1}$$

For example, if a typical finger force 415 for the reference representation 205 is 0.1 Newtons (N), a finger force 415 for the digital representation 210 is 0.2 N, k is 1.5, and S1 is 0.05 mm$^2$, MS1 may be calculated as (1.5)(0.05)(0.1)/0.2 or 0.0375 mm$^2$.

Figure 12:
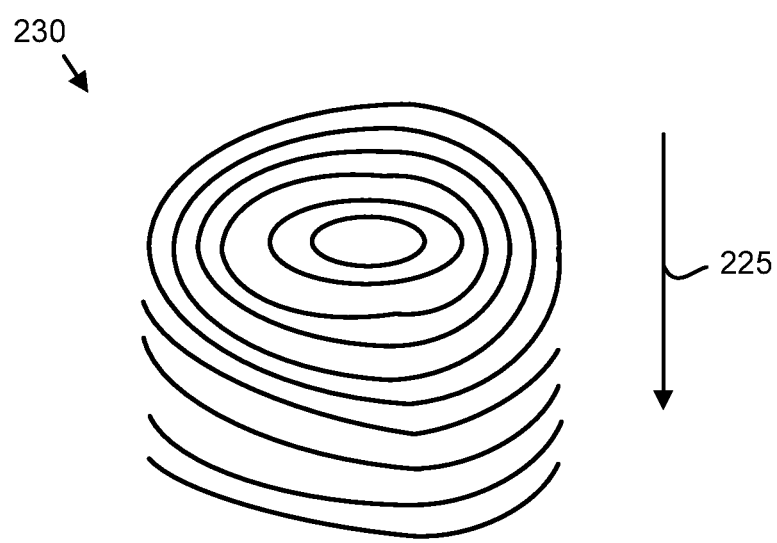
FIG. 12 is a drawing illustrating one embodiment of a modified digital representation of a fingerprint.

In one embodiment, the typical finger force 415 for the reference representation 205 may vary with each discrete interval of the pressure gradient 215. Alternatively, the constant k may vary with each discrete interval of the pressure gradient 215. In a certain embodiment, the typical finger force 415 for the reference representation 205 may vary across the pressure gradient 215 as a function of distance from the first edge of the pressure gradient 215. Alternatively, the value of k may vary across the pressure gradient 215 as a function of distance from the first edge of the pressure gradient 215. Modifying the digital reference 205 may yield a modified digital reference such as is illustrated in FIG. 12.

Figure 10:
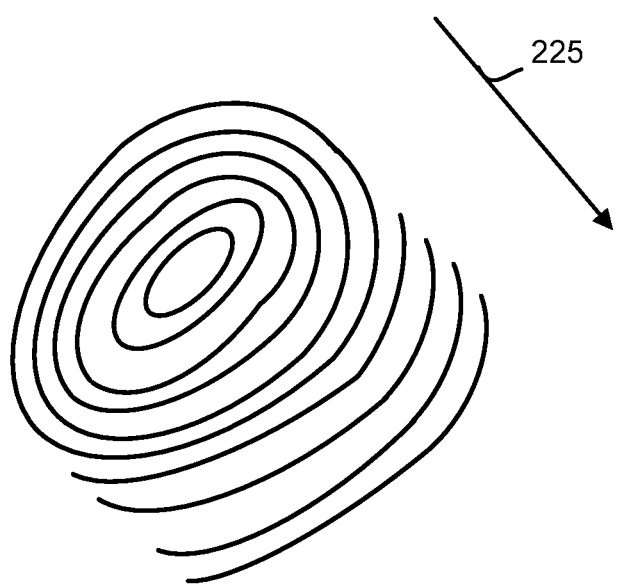
FIG. 10 is a drawing illustrating one embodiment of an orientation of the digital representation of a fingerprint.

FIG. 10 is a drawing illustrating one embodiment of an orientation 225 of the digital representation 210 of a fingerprint. The modification module 405 may identify the orientation 225 from the swipe direction. Alternatively, the modification module 405 may indicate a portion of the digital representation 210 as the finger making the initial contact in response to the finger force 415 and another portion of the digital representation 210 as the finger making last contact and align the orientation 225 between the initial contact and the last contact.

In one embodiment, the modification module 405 modifies the digital representation 210 so that the orientation 225 of the digital representation 210 matches an orientation 225 of the reference representation 205. The modification module 405 may apply a function to the digital representation 210 to modify the orientation 225 of the digital representation 210. Modifying the digital reference 210 may yield a modified digital reference with the orientation 225 aligned to the orientation 225 of the reference representation 205 such as is illustrated in FIG. 12.

Figure 11:
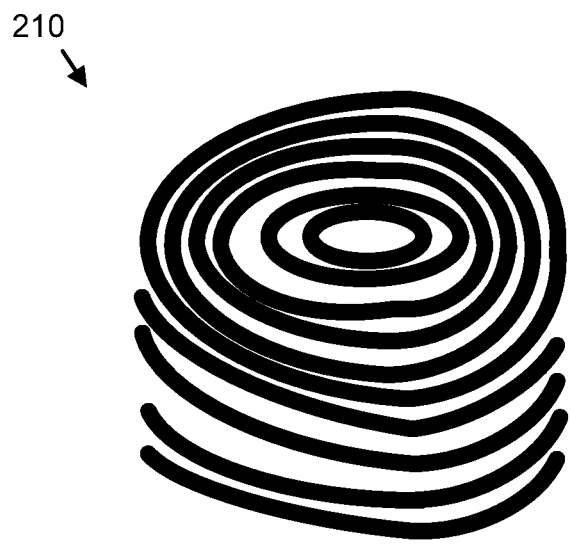
FIG. 11 is a drawing illustrating one embodiment of a digital representation of a fingerprint.

FIG. 11 is a drawing illustrating one embodiment of a digital representation 210 of a fingerprint. The digital representation 210 maybe from a scan of the finger by the fingerprint scanner 120. The ridge portions of the digital representation 210 are depicted as having a large size. The large size may be a result of a larger finger force 415 during the scanned. The modification module 405 may modify the digital representation 210 so that the digital representation may be compared with the reference representation 205.

The modification module 405 may modify the size of a ridge portion or valley portion S1 of the digital representation 210 using Equation 2, where F1 is the finger force 415 of Equation 1, F0 is the typical finger force 415 of Equation 1, m is a non-zero constant, S0 is the size of the ridge portion or valley portion of the digital representation 210, and MS1 is the modified size of the ridge portion or valley portion.

$$MS1 = (m*(S1/SO)^{1/2} *F0)/(F1) \quad \text{Equation 1}$$

Modifying the digital reference 205 may yield a modified digital reference with the ridge portions and valley portions equivalent to a modified digital representation such as is illustrated in FIG. 12.

FIG. 12 is a drawing illustrating one embodiment of a modified digital representation 230 of a fingerprint. The modified digital representation 230 has valley portions and ridge portions that are substantially equivalent to the valley portions and their ridge portions of the reference representation 205. In addition, the orientation 225 of the modified digital representation 230 is aligned with the orientation 225 of the reference representation 205. The modified digital representation 230 may be unambiguously compared with the reference representation 205 to identify the finger of the user.

The embodiments modify the digital representation 210 using force information. The modified digital representations 230 may be more accurately identified when compared with the reference representation 205. In addition, the force information may be used to increase the accuracy of the identification, and prompt a user about how to position a finger for a recognizable scan.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a fingerprint scanner that generates a digital representation of a fingerprint for a finger in contact with the fingerprint scanner;
   a pressure sensor in physical communication with the fingerprint scanner and that measures a finger force of the finger; and
   a computer readable storage medium that stores machine readable code and a processor that executes the machine readable code, the machine readable code comprising a modification module that receives the digital representation and the finger force and modifies the digital representation by modifying valley characterisitics and ridge characteristics of the digital representation in response to the finger force.

2. The apparatus of claim 1, the finger force comprising a swipe trajectory.

3. The apparatus of claim 2, the modification module modifying an orientation of the digital representation in response to the swipe trajectory.

4. The apparatus of claim 1, the modification module further modifying the digital representation in response to the finger force.

5. The apparatus of claim 4, the modification module modifying the digital representation with a pressure gradient in response to the finger force.

6. The apparatus of claim 4, the modification module delimiting the digital representation as a partial fingerprint in response to the finger force.

7. The apparatus of claim 4, the modification module indicating a portion of the digital representation as making initial contact in response to the finger force.

8. The apparatus of claim 4, the modification module further calculating a typical finger force for the finger and appending the typical finger force to a reference representation.

9. The apparatus of claim 8, the machine readable code further comprising a biometric module, the biometric module identifying the fingerprint by comparing the reference representation to the modified digital representation and the typical finger force to the finger force.

10. The apparatus of claim 1, the machine readable code further comprising a biometric module, the biometric module analyzing the finger force, calculating a contact approach change from the finger force, and communicating the contact approach change to a user.

11. The apparatus of claim 1, wherein the fingerprint scanner is selected from the group consisting of an optical scanner, a thermal scanner, a silicone scanner, and an ultrasonic scanner.

12. A method comprising:
    generating, by use of a processor, a digital representation of a fingerprint for a finger in contact with a fingerprint scanner;
    measuring a finger force of the finger on the fingerprint scanner;
    receiving the digital representation and the finger force; and
    modifying the digital representation by modifying valley characterisitics and ridge characteristics of the digital representation in response to the finger force.

13. The method of claim 12, further comprising identifying the fingerprint by comparing the reference representation to the modified digital representation.

14. The method of claim 12, further comprising:
    analyzing the finger force;
    calculating a contact approach change from the finger force; and
    communicating the contact approach change to a user.

15. A system comprising:
    a display;
    a motherboard in communication with the display and comprising a processor and a computer readable storage medium;
    a fingerprint scanner that generates a digital representation of a fingerprint for a finger in contact with the fingerprint scanner and communicates the digital representation to the motherboard;
    a pressure sensor in physical communication with the fingerprint scanner and that measures a finger force of the finger and communicates the finger force to the motherboard; and
    the motherboard further modifying the digital representation by modifying valley characterisitics and ridge characteristics of the digital representation in response to the finger force.

16. The system of claim 15, the motherboard further calculating a typical finger force for the finger, appending the typical finger force to a reference representation, identifying the fingerprint by comparing the reference representation to the modified digital representation and the typical finger force to the finger force.

\* \* \* \* \*